United States Patent [19]

Takakura et al.

[11] Patent Number: 5,264,946
[45] Date of Patent: Nov. 23, 1993

[54] APPARATUS AND METHOD FOR IMAGE EXTRACTION WITH THRESHOLD ADJUSTMENT

[75] Inventors: Masaki Takakura, Higashi-Osaka; Yasukuni Yamane, Shiki; Noritoshi Kako, Nara, all of Japan

[73] Assignee: Sharp Kabushiki Kaisha, Osaka, Japan

[21] Appl. No.: 735,606

[22] Filed: Jul. 25, 1991

[30] Foreign Application Priority Data

Jul. 30, 1990 [JP] Japan ................... 2-201824

[51] Int. Cl.$^5$ .............................. H04N 1/46
[52] U.S. Cl. ................... 358/466; 358/500; 358/527
[58] Field of Search ............... 358/466, 406, 465, 75, 358/80

[56] References Cited

U.S. PATENT DOCUMENTS 4,908,875  3/1990  Assael et al. ................ 358/466

FOREIGN PATENT DOCUMENTS 0051382   3/1985  Japan ................... 358/466
62-222370 9/1987  Japan .
62-222371 9/1987  Japan .
62-220369 9/1988  Japan .

OTHER PUBLICATIONS

Patent Abstracts of Japan–corresponding to the references 1 to 3.

Primary Examiner—Edward L. Coles, Sr.
Assistant Examiner—Jill Jackson
Attorney, Agent, or Firm—Nixon & Vanderhye

[57] ABSTRACT

An image processing apparatus is provided with: at least one image memory for storing each picture element value of an original image; a coordinate inputting device by which a coordinate of an arbitrary point on the original image can be inputted; a device for setting a threshold according to the picture element value at the coordinate inputted by the coordinate inputting device; and a data buffer for successively storing the set threshold. The image processing apparatus is further provided with at least one look up table for converting each picture element value to either one color component data, which color indicates that the picture element value is within the region prescribed by the set threshold, or another color component data, which color indicates that the picture element value is outside the region prescribed by the set threshold, according to the set threshold, each time the threshold is set by the threshold setting device. The threshold setting device sets as a new threshold, a value between the currently set threshold and the previously set threshold, which has been set before the currently set threshold and stored in the data buffer, when canceling the currently set threshold.

10 Claims, 2 Drawing Sheets

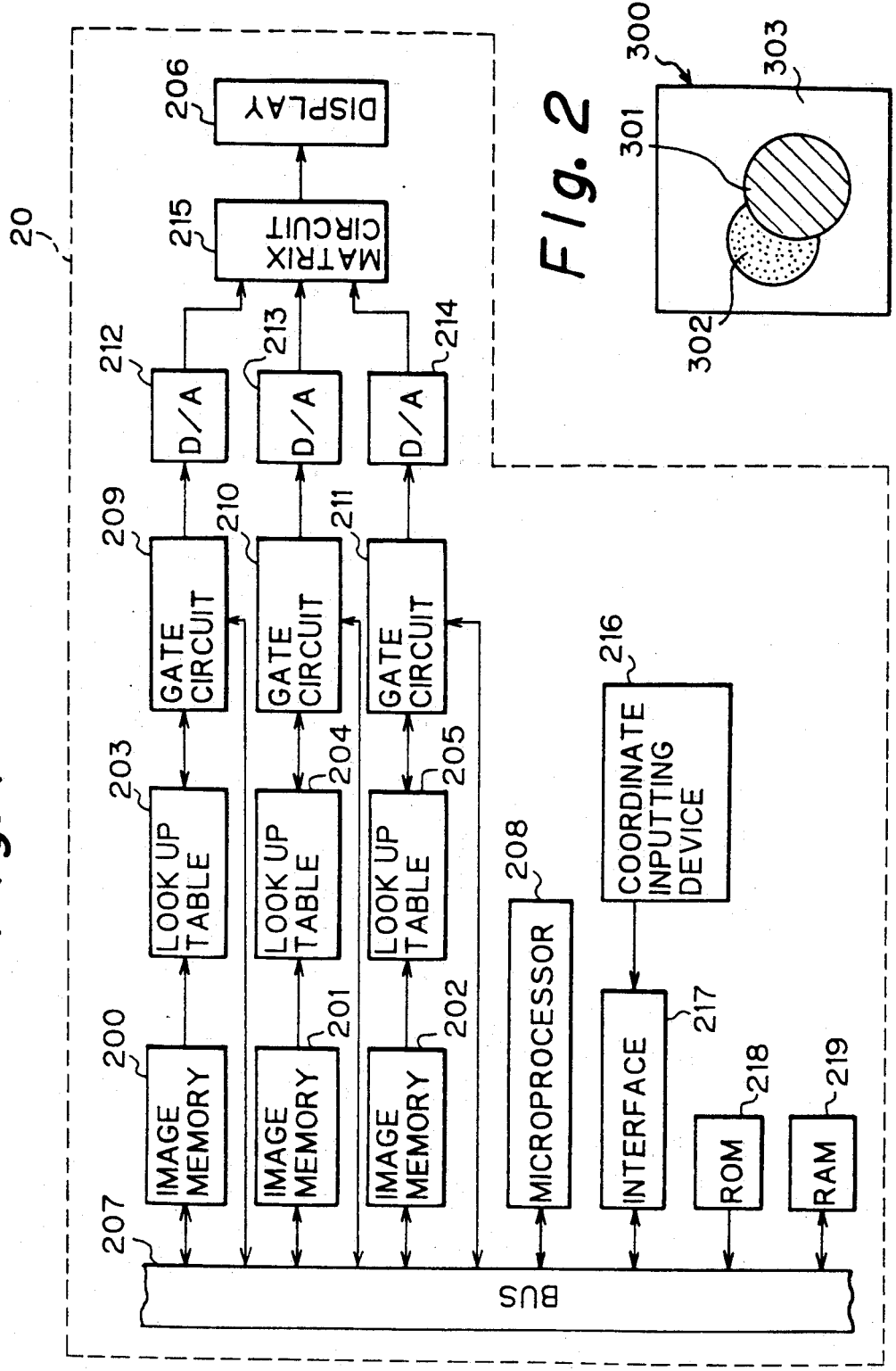

APPARATUS AND METHOD FOR IMAGE EXTRACTION WITH THRESHOLD ADJUSTMENT

BACKGROUND OF THE INVENTION

1. Field of the Invention

The present invention relates to an image processing apparatus, which has a function to extract a desired region of an image.

2. Description of the Related Arts

As an image processing technique by use of a computer, there are various types of region extracting techniques to extract a specific region of an image, with a purpose to perform an image process such as a color changing process, a copying process, a moving process, a transforming process, a rotating process and so on.

Some of these region extracting techniques are adapted to automatically perform such an image process by means of a software, in which a binary coding process is executed to assigning "1" to a region to be extracted, while assign "0" to other regions, on the basis of a characteristic information or a statistical information, such as gray level, chromaticity positional information or differential value of the image, for example.

However, in this kind of region extracting technique, since statistical information is utilized as a threshold for binary coding, there is a problem in that the actual extracted region is inevitably turned to be more or less different from the region intended to be extracted by the operator.

Here, the inventor of the present invention knows that, to overcome the above mentioned problem, a region extracting technique in which the operator is allowed somehow to repetitive set and change the threshold for binary coding until a satisfactory result of region extracting is obtained. Such a region extracting technique will be explained hereinbelow.

In an image processing apparatus by means of such a region extracting technique, at first, data of each picture element of an original image are stored into an image memory, and then, the binary coding process is performed according to a threshold set by an operator. Then, the result is stored into the same image memory or another memory for binary image data. In this manner, after finishing the binary coding process for the entire image, the binary coded data of the result is transferred to a display device, which displays the result of the region extracting process. Accordingly, each time this binary coding process is performed, the data in the image memory or another memory for binary image data are rewritten, with a drawback that the access time with the memory is increased, and thus the image processing speed is considerably lowered.

In Japanese Patent Application Laying Open No. 62-222,370, an image processing technique is disclosed which is intended to overcome this kind of problem as mentioned above. In this reference, the image processing apparatus is provided with an image memory for storing data of each picture element of an original image to be processed, and a look up table disposed between the image memory and a display device. When, a threshold is set in this image processing apparatus, the content of the look up table is changed, and the extracted region is immediately displayed on the display device, so as to allow the operator to speedily and visually verify the currently set threshold is a sufficient value or not, on the display. This image processing apparatus will be explained in detail hereinbelow.

Color image data have three color components, i.e. the three components of R (red), G (green), B (blue), the three components of Y (brightness), R-Y, B-Y (color differences), and the three components of brightness, chromaticity and hue, for example.

Accordingly, three image memories are provided in this image processing apparatus in case of color image processing, and further, three look up tables are provided in this case, each being connected between each image memory and the display. Each of the look up tables is adapted to convert the data values of the image element stored in the image memory and transfer the converted data to the display.

Hereinbelow, the manner of setting the threshold in this image processing apparatus, will be explained with respect to the case that the color image data are stored in the form of Y, R-Y, B-Y color components, where a similar discussion is effected with respect to the R, G, B or other three color components. Here, the color image data stored by Y, R-Y, B-Y components are represented by (y, r, b). As thresholds for region extracting process, the thresholds for the Y component are represented by Ty1 and Ty2, the thresholds for the R-Y component are represented by Tr1 and Ty2, the thresholds for the B-Y component are represented by Tb1 and Tb2. The input and output for the look up table of Y component are represented by yi and yo, respectively. The input and output for the look up table of R-Y component are represented by ri and ro, respectively. The input and output for the look up table of B-Y component are represented by bi and bo, respectively.

At this time, in order to display the region which is surrounded by these six thresholds, i.e. the region to be extracted, the look up tables are set as expressed by the following expressions (1) to (6), for example.

if $yi < Ty1$, or $Ty2 < yi$; $yo = Ny$ ... (1)

if $Ty1 \leq yi \leq Ty2$; $yo = My$ ... (2)

if $ri \leq Tr1$, or $Tr2 \leq ri$; $ro = Nr$ ... (3)

if $Tr1 \leq ri \leq Tr2$; $ro = Mr$ ... (4)

if $bi < Tb1$, or $Tb2 < bi$; $bo = Nb$ ... (5)

if $Tb1 \leq bi \leq Tb2$; $bo = Mb$ ... (6)

Wherein, Ni (i=y, r, b) represents a color component data indicating that the pertinent region is outside of the region to be extracted according to the currently set thresholds, while Mi (i=y, r, b) represents a color component data indicating that the pertinent region is inside of the region to be extracted according to the currently set thresholds.

By setting the look up tables in this manner, if each of the three components of the image data is between each pair of the thresholds, i.e. if the above mentioned expressions (2), (4) and (6) are simultaneously satisfied, the output of the look up tables (yo, ro, bo) become (My, Mr, Mb). Namely, the color of the region on the display becomes (My, Mr, Mb).

Accordingly, the region displayed by this color corresponds to the region to be extracted according to the currently set threshold, which can be visually and immediately checked by the operator. Here, since this process can be executed only by changing the content of the look up table but not changing the content of the image memory, the processing speed can be made high. For example, the size of the look up table is as little as 256 bytes in case that the input is 8 bits and the output is 8 bits, this makes the total size of the three look up tables as little as 768 bytes. On the other hand, the size of the image memory is, for example, about 768K bytes in case that the size of the image is 512×512 and size of one picture element is 24 bits. That is to say, by use of the look up table, only 1 over 1000 of the change of the data content is necessary in order to change the thresholds, as compared with the case of changing the image memory without the look up table.

As described above, the operator can change the six thresholds Ty1, Ty2, Tr1, Tr2, Tb1, Tb2 is a conversational manner, if the desired region to be extracted can not be obtained by the currently set thresholds while visually and immediately checking if the currently set thresholds are sufficient or not.

In general, it is desirable to be able to perform the region extracting process or threshold setting process more easily, in such an image processing apparatus having a function to extract a desired region of an image.

However, in the above described related art apparatus, it is difficult for the operator to find out which one of the six thresholds should be changed so as to obtain the desired region to be extracted. Accordingly, the threshold setting process is performed in a trial and error manner, with a drawback being that a wrong threshold is often set by the operator and the easy and speedy process can not be actually realized in this sense.

As one of the methods to correct an erroneous threshold or find out a proper threshold in a relatively speedy manner in such an image processing apparatus, the inventor of the present invention knows an "undo" method. In this "undo" method, the previously set threshold is memorized, and when a new threshold is set and turned out to be a wrong value, this new threshold is canceled and the threshold is returned to the memorized previous value, so as to resume the threshold setting process again on the basis of the previous value. However, since the threshold setting process is simply repeated in this "undo" method, there is no guarantee at all of obtaining a proper threshold in the next trial, resulting in that the speedy and easy setting process can not be still realized.

SUMMARY OF THE INVENTION

It is therefore an object of the present invention to provide an image processing apparatus, in which a proper threshold can be easily set for the region extracting process.

According to the present invention, the above mentioned object can be achieved by an image processing apparatus provided with: at least one image memory for storing each picture element value of an original image; a coordinate inputting device by which a coordinate of an arbitrary point on the original image can be inputted; a device for setting a threshold according to the picture element value at the coordinate inputted by the coordinate inputting device; and a data buffer for successively storing the set threshold. The image processing apparatus is further provided with at least one look up table for converting each picture element value to either one color component data, which color indicates that the picture element value is within the region prescribed by the set threshold, or another color component data, which color indicates that the picture element value is outside the region prescribed by the set threshold, according to the set threshold, each time the threshold is set by the threshold setting device. The threshold setting device sets as a new threshold, a value between the currently set threshold and the previously set threshold, which has been set before the currently set threshold and stored in the data buffer, when canceling the currently set threshold.

In the image processing apparatus, at first, a coordinate of a point within a region desired to be extracted on an original image, is inputted by the operator, by use of the coordinate inputting device. The threshold setting device sets the threshold according to the picture element value at this inputted coordinate. On the other hand, the data buffer successively stores the set threshold. Then, the look up table converts each picture element value to either one color component data, which color indicates that the picture element value is within the region prescribed by the set threshold, or another color component data, which color indicates that the picture element value is outside the region prescribed by the set threshold, according to the set threshold, each time the threshold is set by the threshold setting device.

Here, just by displaying thus converted color component data as an image on a display, it is possible for the operator to visually check and judge whether the extracted region prescribed by the currently set threshold, exceeds the region desired to be extracted or not, according to the displayed image.

If it is judged that the extracted region exceeds the desired region in this manner, a canceling operation to cancel the currently set threshold, is performed. At this time of canceling, the threshold setting device sets as a new threshold, a value between the currently set threshold and the previously set threshold, which has been set before the currently set threshold and stored in the data buffer. Consequently, by performing such a canceling operation once or a plurality of times, the change in value of the threshold set by the canceling operation gradually becomes smaller and the threshold gradually approaches to the previously set threshold, so that the operator can easily find out and set the most preferable threshold in the process of this canceling operation.

Further objects and advantages of the present invention will be apparent from the following description of the preferred embodiment of the invention as illustrated in the accompanying drawings.

BRIEF DESCRIPTION OF THE DRAWINGS

FIG. 1 is a block diagram showing an image processing apparatus as an embodiment of the present invention;

FIG. 2 is a schematic plan view of an original image to be inputted to the image processing apparatus of FIG. 1.

DETAILED DESCRIPTION OF THE PREFERRED EMBODIMENT

Figure 3:
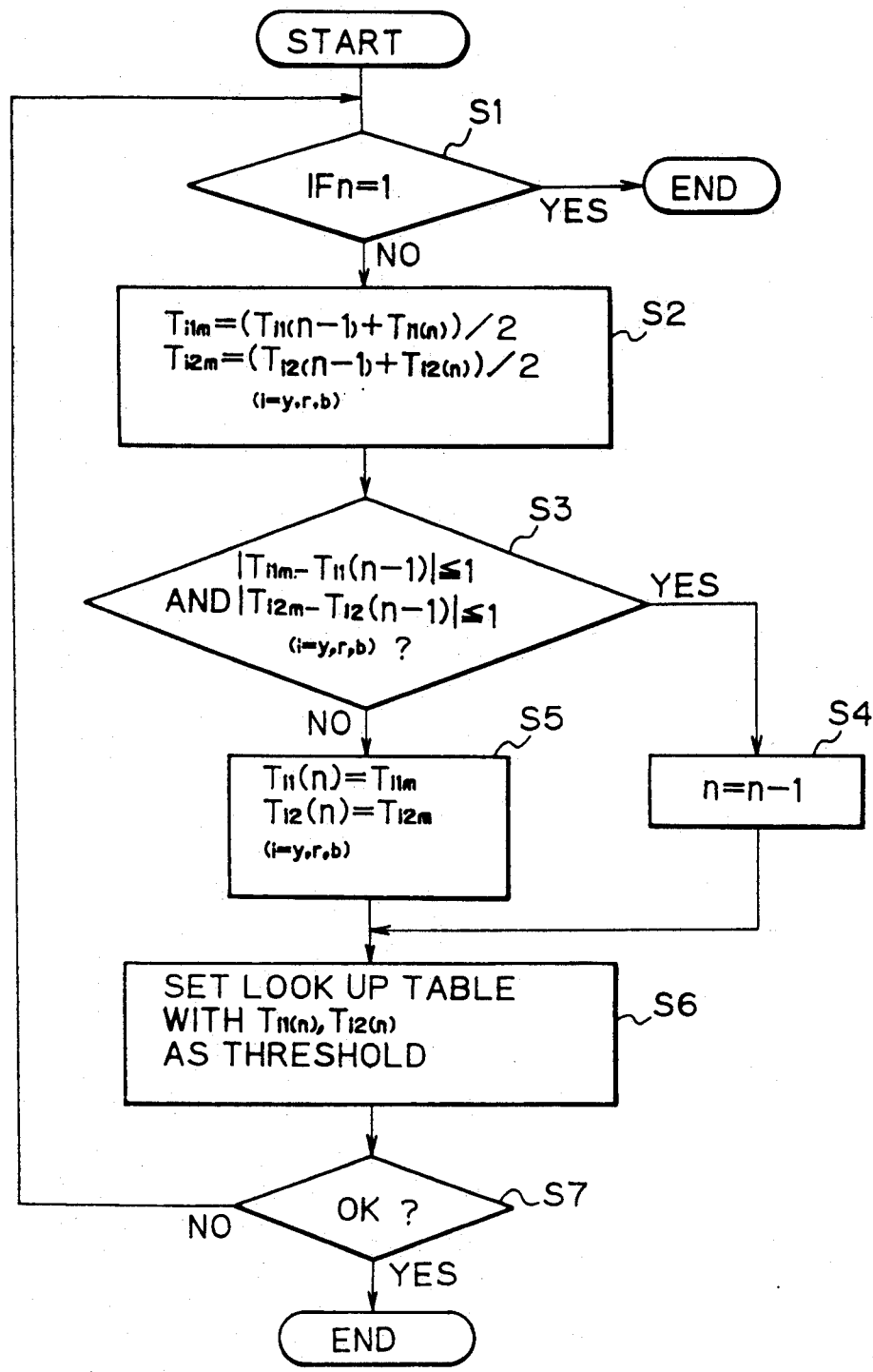
FIG. 3 is a flow chart showing an operation of the image processing apparatus of FIG. 1.

A preferred embodiment of the present invention will be described below with reference to the accompanying drawings.

In FIG. 1, an image processing apparatus 20 is provided with three image memories 200, 201, 202 and three look up tables 203, 204, 205. These three image memories 200, 201, 202 are respectively for three color image data of Y, R-Y, B-y. The outputs of the image memories 200, 201, 202 are connected to the inputs of the look up tables 203, 204, 205, respectively.

The image memories 200, 201, 202 are connected to a bus 207 for information transmission. To the bus 207 is also connected a microprocessor 208. The image memories 200, 201, 202 are accessed through the bus 207 by the microprocessor 208.

Gate circuits 209, 210, 211 are respectively connected with the look up tables 203, 204, 205. The gate circuits 209, 210, 211 are also connected with the bus 207, such that the thresholds set by the microprocessor 208 are inputted through the gate circuits 209, 210, 211 to the look up tables 203, 204, 205 respectively, where the conversion of the image data to the color component data is performed. The outputs of the look up tables 203, 204, 205 are respectively coupled to D/A converters 212, 213, 214 through the gate circuits 209, 210, 211.

The output of the D/A converters 212, 213, 214 are connected with the input of a matrix circuit 215. The output of the matrix circuit 215 is connected with a display 206. The three output signals from the D/A converters 212, 213, 214 are converted to RGB signal in the matrix circuit 215 and the image display of this RGB signal is performed by the display 206. The display 206 may be a CRT (Cathode Ray Tube) display device, a LCD (Liquid Crystal Display) device, or a EL (Electroluminescence) device.

The image processing apparatus 20 is also provided with a coordinate inputting device 216 and an interface circuit 217. The coordinate inputting device 216 is accessed by the microprocessor 208 through the interface circuit 217 and the bus 207. The coordinate inputting device 216 may include a keyboard, a mouse, or a tablet and a wright pen, by which the operator can input an arbitrary coordinate of the image displayed on the display 206.

To the bus 207 is further connected a ROM (Read Only Memory) 218 for storing a system program etc. and a RAM (Random Access Memory) 219 for storing data required for image processing etc., where a portion of the RAM 219 constitutes a data buffer for successively memorizing the thresholds set by the microprocessor 208.

The operation of the image processing apparatus 20 thus constructed, will be explained hereinbelow with reference to FIGS. 1 to 3.

At first, an image is inputted to the image memories 200, 201, 202 by means of a scanner, a television camera, and so on, through the bus 207. Here, as a result of this image inputting process, it is supposed that an image 300 shown in FIG. 2 is inputted.

At this time, supposing that the operator desires to extract a hatched image region 301 from other image region 302 and a background image region 303, the coordinates within the hatched image region 301 are one after another inputted by use of the coordinate inputting device 216 shown in FIG. 1. Then, the image data corresponding to the inputted coordinates are one after another stored into the RAM 219.

Then, the thresholds Ty1 and Ty2 for the Y component, the thresholds Tr1 and Tr2 for the R-Y component, and the thresholds Tb1 and Tb2 for the B-Y component are set as following, based on the color image data (yn, rn, bn), which represents color image data stored by the Y, R-Y, B-Y components with respect to the point on the coordinate at the nth input.

Ty1 = minimum value of yi ($1 \leq i \leq n$, i: natural number)
Ty2 = maximum value of yi ($1 \leq i \leq n$, i: natural number)
Tr1 = minimum value of ri ($1 \leq i \leq n$, i: natural number)
Tr2 = maximum value of ri ($1 \leq i \leq n$, i: natural number)
Tb1 = minimum value of bi ($1 \leq i \leq n$, i: natural number)
Tb2 = maximum value of bi ($1 \leq i \leq n$, i: natural number)

At this time, in order to display the region which is surrounded by these six thresholds Ty1, Ty2, Tr1, Tr2, Tb1, Tb2, i.e. the region to be extracted, the look up tables 203, 204, 205 are set as expressed by the aforementioned expressions (1) to (6), for example, where Ni (i=y, r, b) represents a color component data indicating that the pertinent region is outside of the region to be extracted according to these six thresholds, while Mi (i=y, r, b) represents a color component data indicating that the pertinent region is inside of the region to be extracted according to these six thresholds.

By setting the look up tables 203, 204, 205 in this manner, if each of the three components of the image data is between each pair of these thresholds, i.e. if the aforementioned expressions (2), (4) and (6) are simultaneously satisfied, the output (yo, ro, bo) of the look up tables 203, 204, 205 become (My, Mr, Mb). Namely, the color of the region on the display 206 becomes (My, Mr, Mb) at this region.

Accordingly, the region displayed by this color on the display 206 corresponding to the region to be extracted according to these six thresholds Ty1, Ty2, Tr1, Tr2, Tb1, Tb2, can be visually and immediately checked by the operator.

Here, according to this threshold setting method, since the thresholds are set by the minimum or maximum values, the threshold is either widened or is not changed with respect to one coordinate input. Thus, it is required to have a means for changing the currently set threshold, which turns out to be too wide, back to the previously set threshold.

Therefore, in the present embodiment, the process to cancel the once set threshold, is performed as explained below with referring to FIG. 1 and the flowchart of FIG. 3.

In the following explanation, the thresholds for the Y component set at the ith time are represented by Ty1 (i) and Ty2 (i), the thresholds for the R-Y component set at the ith time are represented by Tr1 (i) and Tr2 (i), and the thresholds for the B-Y component set at the ith time are represented by Tb1 (i) and Tb2 (i).

Now, it is assumed that the threshold set at the nth time is required to be canceled, and the flow in the flowchart of FIG. 3 starts from this condition (START).

At the step S1, if the value of n is 1, the process is ended (END), while the flow branches to the step S2 if the value of n is not 1.

At the step S2, each intermediate value of the thresholds Ty1 (n−1), Ty2 (n−1), Tr1 (n−1), Tr2 (n−1), Tb1 (n−1), Tb2 (n−1) inputted at the n−1th time and the thresholds Ty1 (n), Ty2 (n), Tr1 (n), Tr2 (n), Tb1 (n), Tb2 (n) inputted at the nth time respectively, are calculated to be Ty1m, Ty2m, Tr1m, Tr2m, Tb1m, Tb2m.

At the step 3, if six respective differences between the values Ty1 (n−1), Ty2 (n−1), Tr1 (n−1), Tr2 (n−1), Tb1 (n−1), Tb2 (n−1) and the values Ty1m, Ty2m, Tr1m, Tr2m, Tb1m, Tb2m, are all not greater than 1, the flow branches to the step S4. At the step S4, the value of n is reduced by 1, and then, the flow goes to the step S6.

On the other hand, at the step 3, if at least one of the six respective differences between the values Ty1 (n−1), Ty2 (n−1), Tr1 (n−1), Tr2 (n−1), Tb1 (n−1), Tb2 (n−1) and the values Ty1m, Ty2m, Tr1m, Tr2m, Tb1m, Tb2m, are greater than 1, the flow branches to the step S5. At the step S5, the thresholds set at the nth time are replaced by the thresholds calculated in the step S3.

At the step S6, the look up tables 203, 204, 205 are changed according to the new thresholds Ty1 (n), Ty2 (n), Tr1 (n), Tr2 (n), Tb1 (n), Tb2 (n), to display the image region, which is surrounded by these new thresholds, on the display 206.

At the step S7, the operator visually checks the image region on the display 206. Then, if the cancellation of the thresholds is judged to be enough, the process is ended (END). If the cancellation of the thresholds is judged to be not enough, the flow goes back to the step S1, and the process is repeated until the satisfactory result is obtained.

The explanation for this threshold setting operation of the image processing apparatus 20, will be continued with referring to Table 1.

In Table 1, the row numbers are shown in the 1st column, and the content of input by the operator, are shown in the 2nd column. The first three rows (x1, y1), (x2, y2), (x3, y3) in the second column, indicate that the coordinates of these three points are inputted by the operator. The 3rd column indicates color components of the point at the inputted coordinates. Namely, three color components (y, r, b) of the points (x1, y1), (x2, y2), (x3, y3) are (100, 100, 100), (110, 120, 90), (150, 110, 120), at the 1st, 2nd and 3rd rows, respectively.

Under this condition as the initial condition, the thresholds [Ty1 (n)−Ty2 (n), Tr1 (n)−Tr2 (n), Tb1 (n)−Tb2 (n)], which are set based on the values of these color components by the method explained with FIG. 3, are shown in the 4th column. In the 5th column, the row number n of the thresholds to be corrected, are shown.

It is assumed that the canceling operation is performed after inputting three points. How the thresholds are changed as a result, is shown from the 4th row downward in Table 1.

Namely, at the 4th row, the intermediate value between the threshold of the 2nd row and the threshold of the 3rd row, is adopted to give such a value as in the 4th row, where the threshold of the R-Y component is kept in the same value since the threshold of the 3rd row is not changed from the threshold of the 2nd row. Then, at the 5th row, the intermediate value between the threshold of the 4th row and the threshold of the 2nd row, is adopted.

In a same manner, the intermediate value between the threshold of the 5th row and the threshold of the 2nd row is adopted at the 6th row, and the intermediate value between the threshold of the 6th row and the threshold of the 2nd row is adopted at the 7th row. Here, the difference between the threshold of the 7th row and the threshold of the 2nd row becomes not greater than 1, with respect to the B-Y component. However, since the difference between the threshold of the 7th row and the threshold of the 2nd row as for the Y component is not less than 2, the intermediate value is thus adopted.

At the 8th row, the intermediate value between the threshold of the 7th row and the threshold of the 2nd row is calculated as a preliminary step, and the difference between the resultant value and the threshold of the 2nd row, is turned out to be not greater than 1, with respect to all three components. Accordingly, the value of n is reduced by one, and the threshold becomes same value as that of the 2nd row. That is to say, the threshold returns to its condition before the coordinate (x3, y3) is inputted.

As clearly indicated in Table 1, the change of the threshold gradually becomes smaller and smaller from the 4th row to the 8th row. Accordingly, it is possible to set the threshold with a fine adjustment, and thus it is easy for the operator to find out the sufficient value of the threshold.

As described above in detail, according to the present embodiment, since the look up tables 203, 204, 205, convert each picture element value, it is possible for the operator to visually check on the display 206 and judge whether the extracted region prescribed by the currently set threshold, exceeds the region desired to be extracted or not. At this time, if it is judged that the extracted region exceeds the desired region, the canceling operation can be performed, such that the microprocessor 208 sets as a new threshold, a value between the currently set threshold and the previously set threshold stored in the RAM 219. Consequently, by performing such a canceling operation, the change in value of the threshold set by the canceling operation gradually becomes smaller and the threshold gradually approaches to the previously set threshold, so that the operator can easily find out and set the most preferable threshold in the process of this canceling operation.

In the above described embodiment, the intermediate value between the previously set threshold and the currently set threshold to be canceled is adopted as the new threshold on canceling. However, instead of the simple intermediate value, the interior division of these two thresholds with a preferable ratio of m:n, may be adopted as the new threshold. As changing this ratio of m:n, it is possible to change the ratio to approach the previous threshold, where the ratio may be freely chosen by the operator.

In the above described embodiment, the color image data consists of the Y, R-Y and B-Y three components. However, instead of the Y, R-Y and B-Y three components, the R, G and B three components, or the brightness, chromaticity and hue three components, may be utilized. Further, instead of the three components for the full color image processing, a monochrome image may be processed by use of only one set of the image memory, the look up table, the gate circuit and the D/A converter.

Many widely different embodiments of the present invention may be constricted without departing from the spirit and scope of the present invention. It should be understood that the present invention is not limited to the specific embodiments described in this specification, except as defined in the appended claims.

TABLE 1

| ROW No. | INPUT | THREE COLOR COMPONENTS OF INPUTTED COORDINATE | SET THRESHOLD | ROW No. OF THRESHOLD TO BE CORRECTED |
|---|---|---|---|---|
| 1 | (x1, y1) | (100, 100, 100) | [100–100, 100–100, 100–100] | n = 1 |

TABLE 1-continued

| ROW No. | INPUT | THREE COLOR COMPONENTS OF INPUTTED COORDINATE | SET THRESHOLD | ROW No. OF THRESHOLD TO BE CORRECTED |
|---|---|---|---|---|
| 2 | (x2, y2) | (110, 120, 90) | [100–110, 100–120, 90–100] | n = 2 |
| 3 | (x3, y3) | (150, 110, 120) | [100–150, 100–120, 90–120] | n = 3 |
| 4 | CANCEL | | [100–130, 100–120, 90–110] | n = 3 |
| 5 | CANCEL | | [100–120, 100–120, 90–105] | n = 3 |
| 6 | CANCEL | | [100–115, 100–120, 90–102] | n = 3 |
| 7 | CANCEL | | [100–112, 100–120, 90–101] | n = 3 |
| 8 | CANCEL | | [100–110, 100–120, 90–100] | n = 2 |

What is claimed is:

1. An image processing apparatus comprising:
    at least one image memory for storing each picture element of an original image;
    a coordinate inputting means by which a coordinate of an arbitrary point on the original image can be inputted;
    means for setting a threshold of a pair of thresholds, including
        means for determining, in response to an input coordinate, the threshold to be set according to a picture element value at the coordinate inputted by the coordinate inputting means;
        means for canceling a currently set threshold, whereby the currently set threshold becomes a canceled threshold; and
        means responsive to said canceling means for calculating as a new threshold to be set in lieu of the canceled threshold, a value between the canceled threshold and a previously set threshold, said previously set threshold having been determined by said determining means and set before the canceled threshold by said setting means; and
    at least one look up table for converting each picture element value to either a first color component data which indicates that the picture element is within a region prescribed by the pair of thresholds including the set threshold, or a second color component data which indicates that the picture element value is outside the region prescribed by the pair of thresholds including the set threshold, according to the set threshold, when the threshold is set by the threshold setting means.

2. An image processing apparatus according to claim 1, wherein the threshold setting means sets as the new threshold, an average of the currently set threshold and the previously set threshold.

3. An image processing apparatus according to claim 1, wherein the threshold setting means sets as the new threshold, a weighted average of the currently set threshold and the previously set threshold.

4. An image processing apparatus according to claim 1, wherein the threshold setting means comprises a microprocessor.

5. An image processing apparatus according to claim 1, further comprising a display means connected to the look up table for displaying the original image and the region of the original image prescribed by the pair of thresholds including the set threshold.

6. An image processing apparatus according to claim 1, wherein the image processing apparatus comprises three sets of the image memory and the look up table so as to process full color image data of three color components.

7. An image processing apparatus according to claim 6, wherein the three color components are Y, R-Y and B-Y components.

8. An image processing apparatus according to claim 6, wherein the three color components are R, G and B components.

9. An image processing apparatus according to claim 6, wherein the three color components are brightness, chromaticity and hue components.

10. An image processing apparatus according to claim 1, further comprising a data buffer for successively storing the set threshold.

* * * * *